(12) United States Patent (10) Patent No.: US 12,400,816 B2
Steding et al. (45) Date of Patent: Aug. 26, 2025

(54) HIGH VOLTAGE CIRCUIT-BREAKER

(71) Applicant: HITACHI ENERGY LTD, Zurich (CH)

(72) Inventors: Guenter Steding, Lottstetten (DE); Jakub Korbel, Baden (SE); Christoph Wirth, Pfungen (SE)

(73) Assignee: HITACHI ENERGY LTD, Zürich (CH)

( * ) Notice: Subject to any disclaimer, the term of this patent is extended or adjusted under 35 U.S.C. 154(b) by 133 days.

(21) Appl. No.: 18/103,714

(22) Filed: Jan. 31, 2023

(65) Prior Publication Data

US 2023/0245846 A1 Aug. 3, 2023

(30) Foreign Application Priority Data

Feb. 2, 2022 (EP) ..................................... 22154785

(51) Int. Cl.
*H01H 71/10* (2006.01)
*H01H 73/06* (2006.01)
*H01H 73/18* (2006.01)

(52) U.S. Cl.
CPC ........ *H01H 73/18* (2013.01); *H01H 71/1045* (2013.01); *H01H 73/06* (2013.01)

(58) Field of Classification Search
CPC ........ H01H 73/18; H01H 73/06; H01H 73/04; H01H 71/1045; H01H 71/12; H01H 71/10;

(Continued)

(56) References Cited

U.S. PATENT DOCUMENTS 4,319,105 A 3/1982 Lott et al.
5,589,673 A * 12/1996 Lehmann ............... H01H 33/91
218/66

(Continued)

FOREIGN PATENT DOCUMENTS

CA 2214966 A1 3/1998
CH 620790 A5 12/1980

(Continued)

OTHER PUBLICATIONS

Translation of DE2650493 (CH620790) (Original document published May 11, 1978) (Year: 1978).*

(Continued)

*Primary Examiner* — William A Bolton
(74) *Attorney, Agent, or Firm* — Sage Patent Group

(57) ABSTRACT

A high voltage circuit-breaker comprising a housing defining a volume for an insulating gas, at least two making and breaking (M&B) units arranged therein, each M&B unit comprising a first and second contact element for forming an electrically conductive connection, at least the first contact element is movable along an axially extending switching axis of the high voltage circuit-breaker, and the first contact elements of the at least two M&B units are motion-coupled; a drive device connected to the first contact element of at least one M&B unit and configured for moving the first contact element along the switching axis over a moving distance for separating conductive connections; and a gas damper connected to the first contact element of the at least one M&B unit and configured for damping movement of the first contact element with a damping force increasing in relation to the moving distance.

19 Claims, 2 Drawing Sheets

(58) Field of Classification Search
CPC .... H01H 33/14; H01H 33/52; H01H 33/7092; H01H 33/74; H01H 33/91; H01H 3/605; H01H 3/60; F16F 9/346; F16F 9/48
USPC ..... 218/1, 11–13, 52, 57, 59, 60, 66, 93, 99, 218/116; 417/312; 200/82 B
See application file for complete search history.

(56) References Cited

U.S. PATENT DOCUMENTS

| | | | | |
|---|---|---|---|---|
| 7,528,332 | B1 * | 5/2009 | Via | H01H 39/00 200/82 B |
| 8,822,868 | B2 * | 9/2014 | Kehr | H01H 33/86 218/66 |
| 9,524,836 | B2 * | 12/2016 | Ozil | H01H 33/901 |
| 9,627,155 | B2 * | 4/2017 | Heiermeier | H01H 3/00 |
| 9,837,230 | B2 * | 12/2017 | Bujotzek | H01H 33/7023 |
| 11,062,862 | B2 * | 7/2021 | Galletti | H01H 33/95 |
| 11,569,047 | B2 * | 1/2023 | Bietz | F16F 9/49 |
| 2010/0163527 | A1 | 7/2010 | Yoon | |

FOREIGN PATENT DOCUMENTS

| | | |
|---|---|---|
| CN | 104319168 A | 1/2015 |
| DE | 102017212021 A1 | 1/2019 |
| JP | 2003-109476 A | 4/2003 |
| JP | 2003-187681 A | 7/2003 |
| KR | 101287011 B1 | 7/2013 |

OTHER PUBLICATIONS

European Search Report, European Application No. 22154785.4, mailed Sep. 6, 2022, 8 pages.
Japanese Office Action and English Translation, Japanese Application 2023-012798, mailed Jun. 26, 2024, 6 pages.
Indian Office Action, Indian Application No. 202344005793, mailed Jan. 27, 2025, 2 pages.

* cited by examiner

HIGH VOLTAGE CIRCUIT-BREAKER

CROSS REFERENCE TO RELATED APPLICATIONS

This application claims priority to European Patent Application No. 22154785.4, filed on Feb. 2, 2022, the disclosures and content of which is incorporated by reference herein in its entirety.

TECHNICAL FIELD

The present disclosure relates to a high voltage circuit-breaker comprising a housing defining a volume for an insulating gas, at least two making and breaking units arranged in the housing, whereby each making and breaking unit comprises a first contact element and a second contact element for forming an electrically conductive connection, the first contact element is movable along an axially extending switching axis of the high voltage circuit-breaker, and the first contact elements of the at least two making and breaking units are motion-coupled and a drive device connected to the first contact element of at least one making and breaking unit and configured for moving the first contact element along the switching axis over a moving distance for separating conductive connections.

BACKGROUND ART

A high voltage circuit-breaker, in particular for high current and voltage ratings, often becomes massive and at the same time requires high opening speed for guaranteeing interrupting performance, in particular for SF6 free breakers due to worse performance of alternative gases. Gas dampers are used for such circuit-breaker for safely decelerate opening or closing operations at an end of a movement when separating conductive connections.

However, todays gas damper implementations for high voltage circuit-breaker, when fast mechanical opening and closing operations occur in multi chamber high voltage circuit-breaker, require an effective braking. Such braking, due to high masses of the multi chambers, which are particularly needed for SF6 or SF6 free circuit-breaker, is even harder and sometime even impossible to achieve.

SUMMARY OF INVENTION

It is therefore an object of the present disclosure to provide a high voltage circuit-breaker having an improved gas damper and a respective method.

The object of the present disclosure is solved by the features of the independent claims. Preferred implementations are detailed in the dependent claims.

Thus, the object is solved by a high voltage circuit-breaker comprising:
  a housing defining a volume for an insulating gas,
  at least two making and breaking units arranged in the housing, whereby each making and breaking unit comprises a first contact element and a second contact element for forming an electrically conductive connection, at least the first contact element is movable along an axially extending switching axis of the high voltage circuit-breaker, and the first contact elements of the at least two making and breaking units are motion-coupled;
  a drive device connected to the first contact element of at least one making and breaking unit and configured for moving the first contact element along the switching axis over a moving distance for separating conductive connections; and
  a gas damper connected to the first contact element of the at least one making and breaking unit and configured for damping the movement of the first contact element with a damping force increasing in relation to the moving distance.

A key point of the present disclosure is therefore that the proposed gas damper keeps high opening speeds of the first contact element while increasing fatigue strength at the same time, which is especially advantageous for SF6 free applications. The gas damper reduces required damping pressures and reduces or eliminates pressure forces in additional elements, such as composite material side rods described below. Thereby such forces are advantageously reversed into tensile forces. As a result, stability of the high voltage circuit-breaker is massively increased and deflections due to pressure forces are greatly reduced. As the damping force increases in relation to the moving distance, for example is much greater at an end of the movement than at a beginning of the movement, the breaking force does not hinder interruption performance.

In other words, in such way it becomes possible to slowly enter the end of a stroke without major force peaks, while effectively dissipating kinetic energy during braking operations. The proposed solution further overcomes limits in permissible damping pressure of hydro mechanical drives and reduces load on insulating components made from composite materials, typically having lower strength in compression and significantly higher in tension, while on the other side preventing buckling or non-reversible deformation of such elements. The proposed high voltage circuit-breaker further reduces oscillations of these and other elements, which, if not prevented, would in turn need to be overcome by increasing distances and tolerances, therefore increasing weight and volume of the high voltage preferably gas insulated circuit-breaker.

The housing is preferably provided gas-tight and/or comprises a tube-like or cylinder like form extending along the switching axis. The first contact element and/or the second contact element preferably extend along the switching axis. The second contact element can be fixed relative to the housing, but can be arranged movable along the switching axis. The term motion-coupled means that if the first contact element of the at least one making and breaking unit is moved by the drive device, the first contact element of the least one another making and breaking unit is moved in parallel, preferably that all first contact elements are moved in parallel. The drive device is preferably motorized and/or provided outside of the housing. In such implementation the drive device can be connected to the first contact element via a pull rod. The drive device may comprise an additional damper, which can be associated and/or integrated to the drive device.

The making and breaking unit can be provided as interrupter. The at least two making and breaking units are preferably electrically connected in series and/or arranged in different distances from the drive device. The gas damper is preferably associated and/or arranged at the at least one making and breaking unit arranged utmost distant to the gas damper. For example, when having three making and breaking units arranged in an order with the first making and breaking unit adjacent to the drive device, the gas damper is preferably arranged between the second and third making and breaking unit.

The moving distance is preferably at least the distance between a state when the first contact element and the second contact element form the electrically conductive connection and another state when said contact elements do not form such electrically conductive connection. The term damping the movement of the first contact element with a damping force increasing in relation to the moving distance means in particular that the damping force increases with the moving distance, for example may be low or even zero at the beginning when the first contact element and the second contact element still form the electrically conductive connection, preferably at zero or minimum moving distance, and may be highest when first contact element and the second contact element do not form the electrically conductive connection anymore, preferably at maximum moving distance.

The term high voltage relates to voltages that exceeds 1 kV. A high voltage preferably concerns nominal voltages in the range from above 72 kV to 800 kV, like 145 kV, 245 kV or 420 kV. The high voltage circuit-breaker may be provided as a circuit breaker and/or may include one or more components such as, a puffer-type cylinder, a self-blast chamber, a pressure collecting space, a compression space, or puffer volume, and an expansion space. The high voltage circuit-breaker may effectuate interruption of the conductive connections by means of one or more of such components, thereby discontinuing flow of electrical current in the conductive connections, and/or extinction of the arc produced when the conductive connections is interrupted. The term "axial" designates an extension, distance etc. in the direction of the axis. An axial separation between parts means that these parts are separated from each other when seen or measured in the direction of the axis. The term "radial" designates an extension, distance etc. in a direction perpendicular to the axis. The term "cross-section" means a plane perpendicular to the axis, and the term "cross-sectional area" means an area in such a plane. The axis is presently the switching axis.

The insulating gas can be any suitable gas that enables to adequately extinguish the electric arc formed between the contact elements during a current interruption operation, such as, but not limited, to an inert gas as, for example, sulphur hexafluoride SF6. Specifically, the insulating gas used can be SF6 gas or any other dielectric insulation medium, may it be gaseous and/or liquid, and in particular can be a dielectric insulation gas or arc quenching gas. Such dielectric insulation medium can for example encompass media comprising an organofluorine compound, such organofluorine compound being selected from the group consisting of: a fluoroether, an oxirane, a fluoroamine, a fluoroketone, a fluoroolefin, a fluoronitrile, and mixtures and/or decomposition products thereof. Herein, the terms "fluoroether", "oxirane", "fluoroamine", "fluoroketone", "fluoroolefin" and "fluoronitrile" refer to at least partially fluorinated compounds. In particular, the term "fluoroether" encompasses both hydrofluoroethers and perfluoroethers, the term "oxirane" encompasses both hydrofluorooxiranes and perfluorooxiranes, the term "fluoroamine" encompasses both hydrofluoroamines and perfluoroamines, the term "fluoroketone" encompasses both hydrofluoroketones and perfluoroketones, the term "fluoroolefin" encompasses both hydrofluoroolefins and perfluoroolefins, and the term "fluoronitrile" encompasses both hydrofluoronitriles and perfluoronitriles. It can thereby be preferred that the fluoroether, the oxirane, the fluoroamine and the fluoroketone are fully fluorinated, i.e., perfluorinated.

The dielectric insulation medium can be selected from the group consisting of: a hydrofluoroether, a perfluoroketone, a hydrofluoroolefin, a perfluoronitrile, and mixtures thereof. In particular, the term "fluoroketone" as used in the context of the present invention shall be interpreted broadly and shall encompass both fluoromonoketones and fluorodiketones or generally fluoropolyketones. Explicitly, more than a single carbonyl group flanked by carbon atoms may be present in the molecule. The term shall also encompass both saturated compounds and unsaturated compounds including double and/or triple bonds between carbon atoms. The at least partially fluorinated alkyl chain of the fluoroketones can be linear or branched and can optionally form a ring. The dielectric insulation medium may comprise at least one compound being a fluoromonoketone and/or comprising also heteroatoms incorporated into the carbon backbone of the molecules, such as at least one of: a nitrogen atom, oxygen atom and sulphur atom, replacing one or more carbon atoms. More preferably, the fluoromonoketone, in particular perfluoroketone, can have from 3 to 15 or from 4 to 12 carbon atoms and particularly from 5 to 9 carbon atoms. Most preferably, it may comprise exactly 5 carbon atoms and/or exactly 6 carbon atoms and/or exactly 7 carbon atoms and/or exactly 8 carbon atoms.

Further, the dielectric insulation medium may comprise at least one compound being a fluoroolefin selected from the group consisting of: hydrofluoroolefins (HFO) comprising at least three carbon atoms, hydrofluoroolefins (HFO) comprising exactly three carbon atoms, trans-1,3,3,3-tetrafluoro-1-propene (HFO-1234ze), 2,3,3,3-tetrafluoro-1-propene (HFO-1234yf), and mixtures thereof. The organofluorine compound can also be a fluoronitrile, in particular a perfluoronitrile. In particular, the organofluorine compound can be a fluoronitrile, specifically a perfluoronitrile, containing two carbon atoms, and/or three carbon atoms, and/or four carbon atoms. More particularly, the fluoronitrile can be a perfluoroalkylnitrile, specifically perfluoroacetonitrile, perfluoropropionitrile (C2F5CN) and/or perfluoro-butyronitrile (C3F7CN). Most particularly, the fluoronitrile can be perfluoroisobutyronitrile (according to the formula (CF3)2CFCN) and/or perfluoro-2-methoxypropanenitrile (according to formula CF3CF(OCF3)CN). Of these, perfluoroisobutyronitrile (i.e. 2,3,3,3-tetrafluoro-2-trifluoromethyl propanenitrile alias i-C3F7CN) is particularly preferred due to its low toxicity. The dielectric insulation medium can further comprise a background gas or carrier gas different from the organofluorine compound (in particular different from the fluoroether, the oxirane, the fluoroamine, the fluoroketone and the fluoroolefin) and can in embodiments be selected from the group consisting of: air, N2, O2, CO2, a noble gas, H2; NO2, NO, N2O; fluorocarbons and in particular perfluorocarbons, such as CF4; CF3I, SF6; and mixtures thereof. For example, the dielectric insulating gas can be CO2 in an embodiment.

According to a preferred implementation the damping force increases proportional, non-linear or exponential in relation to the moving distance. It is thus preferred that braking becomes more effective at an end of a braking operation i.e., when the contact elements are separated and not conductive anymore, or towards or at maximum moving distance. In other words, it is according to the present implementation preferred that the damping force becomes greater in respect to the moving distance or with greater moving distance. For example, the damping force can be very low or zero at the beginning of the moving for disconnecting the contact elements, whereby the damping force increases proportional, non-linear or exponential towards its maximum in the disconnected state, when braking is actually needed.

In another preferred implementation the gas damper comprises at least one through hole, in particular arranged in a radially extending lateral surface and/or in an axially extending side surface. By means of such through hole, for example having a diameter of 1, 2, 5, 10, 20 or 50 mm, the damping volume defined by the gas damper will not be kept sealed towards the housing, thereby reducing maximum achievable breaking pressure. The gas damper may comprise a plurality of holes, arranged in regular distances or arranged in closer distances at the beginning of the moving distance.

According to a further preferred implementation the gas damper comprises a damping volume having a closed first end and a piston element configured for moving into the damping volume from a second end opposite to the first end. The damping volume and/or the gas damper may comprise the shape of an axially extending barrel respectively cylinder like form. Such way the piston element is preferably provided as a radially extending circle formed plate slidably and/or touching arranged in the damping volume. Preferably, the damping volume is provided as a cylinder closed at the first end, whereby the piston element is provided at the second end. The piston element preferably moves towards the first end when the drive device disconnects the contact elements. Further preferably the gas damper is arranged between the at least two making and breaking units, for example with the first end facing the second contact element of the first making and breaking unit and the second end facing the second making and breaking unit. In such respect the second end respectively the piston element can be connected to the first contact element of the second making and breaking unit.

According to a further preferred implementation the damping volume comprises at least one opening in an axially extending side surface and whereby another axially extending side surface is provided opening-free for guiding the moving piston element. Such way the opening-free side surface overcomes adjustment difficulties of prior art damping solutions. The opening may comprise a rectangular or square form, whereby a plurality of opening may be provided in regular distances.

In another preferred implementation the opening comprises a width that decreases proportional or exponential in moving direction when separating conductive connections. Due to the decreasing width, insulating gas present in the gas damper may easily escape the damping volume at the beginning of the moving when disconnecting the contact elements, while, with decreasing width, escape becomes more difficult thereby increasing damping of the piston element.

According to a further preferred implementation a radially extending lateral surface of the closed first end and a least a part of an axially extending side surface adjacent to the lateral surface is provided opening-free and/or hole-free. Such way the damping volume and/or the first end is preferably provided cup-like and/or tube-like with closed radially extending lateral surface. The radially extending lateral surface preferably comprise a disc like shape. The part of the axially extending side surface preferably comprises a tube-like shape and/or is provided one-piece with the radially extending lateral surface.

In another preferred implementation the high voltage circuit-breaker comprises at least two side rods connecting the drive device and the gas damper by surrounding at least one of the making and breaking units. Preferably the at least two side rods are provided as poles, bars, or posts and/or surround the gas damper as well. The side rods are preferably arranged in regular intervals around the at least one of the making and breaking units. The side rods are preferably connected on one side to the first contact element of the least one of the making and breaking unit and on the other side to the gas damper. The side rods preferably extend in axial direction parallel and offset to the switching axis. In a further preferred implementation multiple pairs of such at least two side rods are provided, each pair associated to a different making and breaking unit. By such side rods overall diameter of the making and breaking unit can be reduced, since smaller gaps are needed between the side rods, chamber flanges and shields, while smaller gaps are enabled by reduced braking isolation of the side rods.

The object is further solved by a method for decelerating an opening operation of a multi-making and breaking unit high voltage circuit-breaker comprising a housing defining a volume for an insulating gas,
at least two making and breaking units arranged in the housing, whereby each making and breaking unit comprises a first contact element and a second contact element for forming an electrically conductive connection, at least the first contact element is movable along a switching axis of the high voltage circuit-breaker, and the first contact elements of the at least two making and breaking units are motion-coupled; and
a drive device connected to the first contact element of at least one making and breaking unit and configured for moving the first contact element along the switching axis over a moving for separating conductive connections; and comprising the step of:
damping the movement of the first contact element of the at least one making and breaking unit with a damping force increasing in relation to the moving distance.

Such method allows for high opening speeds while increasing fatigue strength of the high voltage circuit-breaker at the same time. The method reduces required damping pressures at the drive and at the same time reduces or eliminates pressure forces in additional elements, such as composite material side rods. As a result, stability of the high voltage circuit-breaker is massively increased and deflections due to pressure forces are greatly reduced.

In a preferred implementation the damping force increases proportional or exponential in relation to the moving distance.

In another preferred implementation the high voltage circuit-breaker comprises a gas damper having at least one through hole, in particular arranged in a radially extending lateral surface and/or in an axially extending side surface, for damping the movement of the first contact element of the at least one making and breaking unit.

According to a further preferred implementation the gas damper comprises a damping volume having a closed first end and a piston element configured for moving into the damping volume from a second end opposite to the first end.

In another preferred implementation the first end is provided cup-like and/or tube-like with closed radially extending lateral surface.

Further implementations and advantages of the method are directly and unambiguously derived by the person skilled in the art from the high voltage circuit-breaker as described before.

BRIEF DESCRIPTION OF DRAWINGS

These and other aspects of the present disclosure will be apparent from and elucidated with reference to the implementations described hereinafter.

In the drawings.

DETAILED DESCRIPTION

Figure 1:
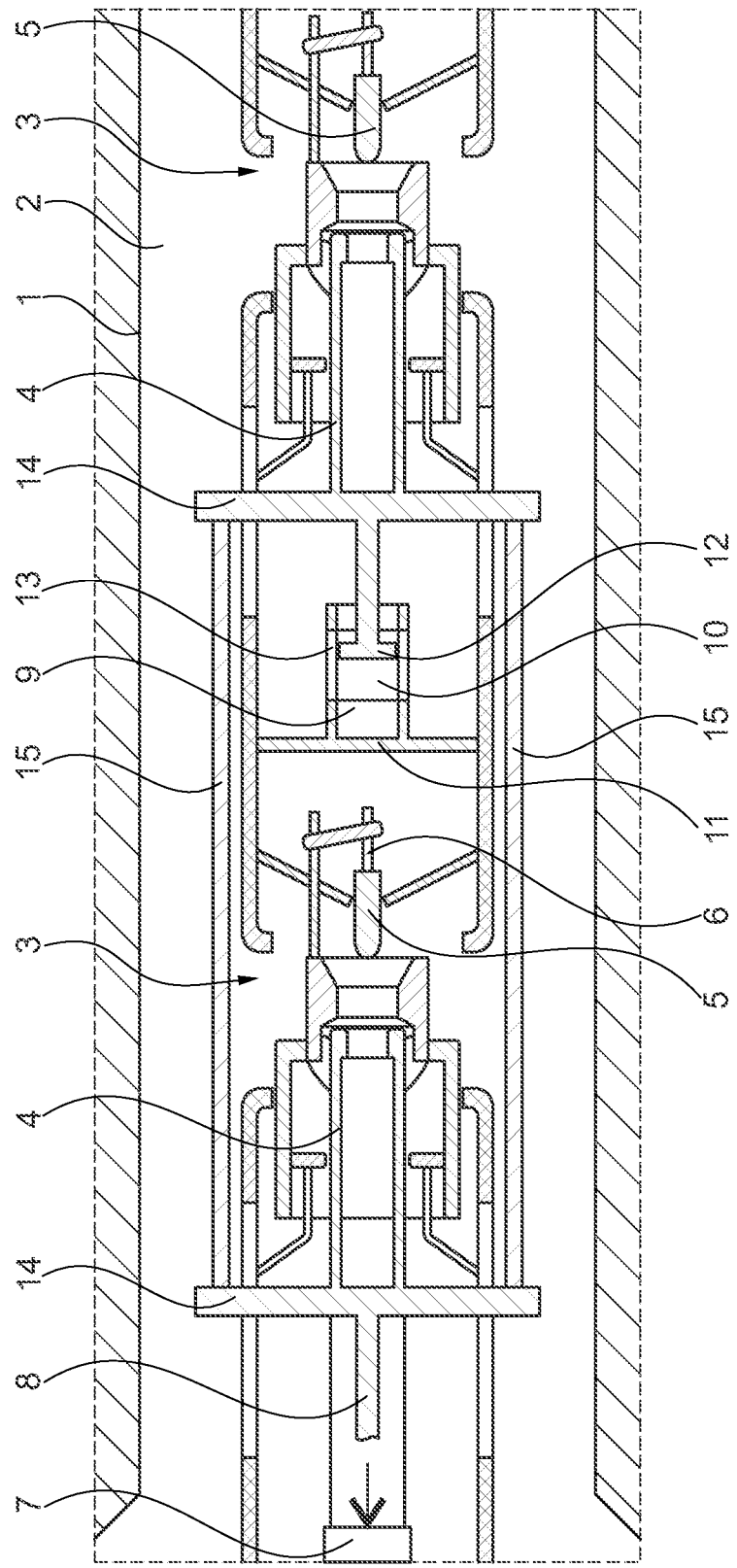
FIG. 1 shows a high voltage circuit-breaker according to a preferred implementation in a cross-sectional schematic view.

FIG. 1 shows a high voltage circuit-breaker according to a preferred implementation in a cross-sectional schematic view.

The high voltage circuit-breaker comprises a gas tight housing 1, which defines a closed volume 2 housing an insulating gas, such as SF6 or an alternative. Arranged within the housing 1 along an axially extending switching axis 6 are two consecutively arranged making and breaking units 3, as generally known from prior art. Each making and breaking unit 3 comprises a first contact element 4 and a second contact element 5 for forming an electrically conductive connection along the axially extending switching axis 6 of the high voltage circuit-breaker. FIG. 1 shows the first contact element 4 and the second contact element 5 electrically conductive connected. The first contact element 4 of each making and breaking unit 3 is movable along the switching axis 6 away and towards the motion fixed second contact element 5. Further, first contact elements 4 of all making and breaking units 3 are motion-coupled, as described below in more detail.

Figure 2:
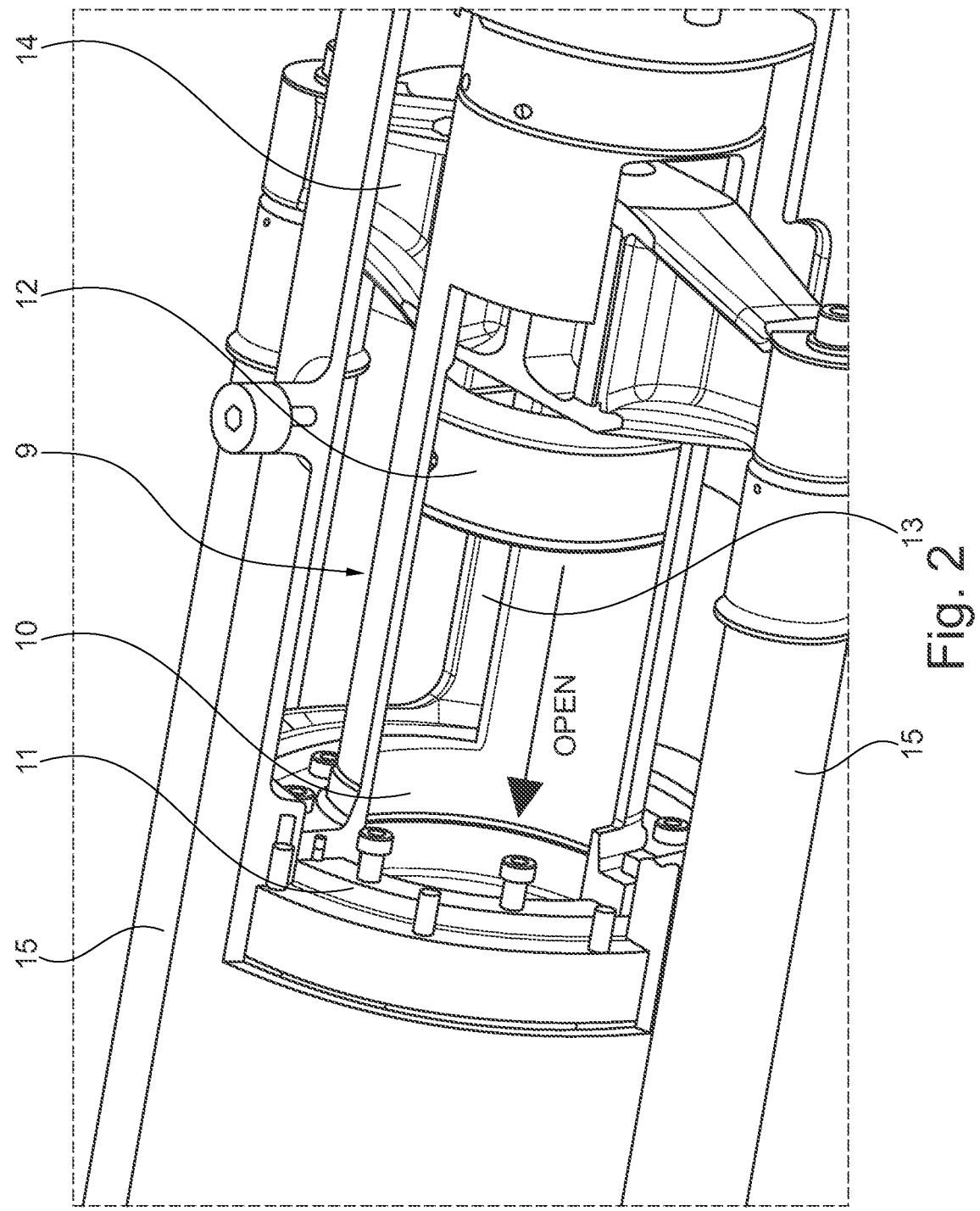
FIG. 2 shows a part of the high voltage circuit-breaker of FIG. 1 with a partially opened gas damper in a perspective schematic view.

The high voltage circuit-breaker further comprises a motorized drive device 7, only schematically depicted, which is arranged along the switching axis 6 in extension of the first contact element 4 of the utmost left respectively first making and breaking unit 3 in FIG. 2. The drive device 7 is connected via an axially along the switching axis 7 extending pull rod 8 to the utmost left respectively first of the first contact elements 4 and such way configured for moving the connected utmost left first contact element 4 along the switching axis 6 over a moving distance for separating conductive connections 4, 5. As the first contact elements 4 of all making and breaking units 3 are motion-coupled, the drive device 7 actually moves all first contact elements 4 for respectively when separating conductive connections 4, 5.

The high voltage circuit-breaker even further comprises a gas damper 9, which is connected to the first contact element 4 of the first utmost left making and breaking unit 3, while arranged between the two making and breaking units 3. While FIG. 1 shows a cross-section view, FIG. 2 show the gas damper 9 in greater detail in a partially opened perspective schematic view. The gas damper 9 damps the movement of the first contact element 4 with a damping force that increases in relation to the moving distance. As the first contact elements 4 of all making and breaking units 3 are motion-coupled, the gas damper 9 damps the movement of all first contact elements 4.

Now referring in particular to FIG. 2, the gas damper 9 comprises a barrel respectively cylinder like form extending along the switching axis 6 and thereby defining a damping volume 10, which in FIG. 2 is shown partially opened towards to front. The damping volume 10 comprises a closed first end 11 facing the drive device 7 respectively the utmost left second contact element 5. The first closed first end 11 is provided cup-like and/or tube-like with closed radially extending lateral surface. The damper 9 further comprises a piston element 12 configured for moving into the damping volume from a second end opposite to the first end 11 along the switching axis 6 for thereby compressing insulating gas present in the gas damper 9 and respectively dissipating kinetic energy. The piston element 12 is guided by the barrel respectively cylinder like form of the gas damper 9.

While the first end 11 forming a radially extending lateral surface with circle like shape is closed, an adjacent axially extending side surface of the barrel respectively cylinder like form of the gas damper 9 is provided opening-free and/or hole-free. Adjacent thereto a remaining part of the lateral surface is partly provided opening-free and/or hole-free for thereby providing guidance to the piston element 12, while the lateral surface is partly provided with openings 13. While FIG. 2 only shows one opening 13, two, three or more openings 13 are provided in the lateral surface, separated by the opening-free and/or hole-free provide lateral surface.

In FIG. 2 the opening comprises a rectangular like shape, in an alternative implementation the opening 13 can comprise a width that decreases proportional or exponential in moving direction of the piston element 12 when separating conductive connections. In a further alternative implementation, the gas damper 9 comprises at least one through hole, arranged in a radially extending lateral surface and/or in an axially extending side surface of the damping volume 10.

By means of these implementations the damping force increases proportional or exponential in relation to the moving distance. Such way performance of the making and breaking unit 3 is not affected as braking predominately works at an end of the moving distance i.e., when the piston element 12 comes closer to the first end 11. Sizes respectively diameter of the through hole and/or the opening 13 are preferably dimensioned that the drive device 7 damping pressure is not exceeded.

By now referring to both FIGS. 1 and 2 it can be seen that, starting from the left, the drive device 7 is connected via the pull rod 8 with the first contact element 4 of the first respectively utmost left making and breaking unit 3. The first contact element 4 is connected to the pull rod 8 via a radially extending strap like device 14. A second strap like device 14 is arranged between the piston element 12 and the first contact element 4 of the second respectively right making and breaking unit 3 thereby also connecting the piston element 12 to the first contact element 4 of the second respectively right making and breaking unit 3. Both strap like devices 14 are connected by two axially extending side rods 15.

The side rods 15 are arranged radially opposite to each other thereby surrounding the first respectively utmost left making and breaking unit 3 and the gas damper 9 and providing the motion-coupling of the first contact elements 4 of the two making and breaking units 3. While not shown in FIG. 1, the high voltage circuit-breaker may comprise further pairs of rods 15 connecting more than two making and breaking units 3. Also, more than two side rods 15 may be present for connecting two making and breaking units 3, where the side rods 15 are preferably arranged in regular distances.

While the present disclosure has been illustrated and described in detail in the drawings and foregoing description, such illustration and description are to be considered illustrative or exemplary and not restrictive. Other variations to the disclosed implementations can be understood and effected by those skilled in the art in practicing the present disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 1 housing
2 volume
3 making and breaking unit
4 first contact element
5 second contact element
6 switching axis
7 drive device
8 pull rod
9 gas damper
10 damping volume
11 closed first end
12 piston element
13 opening
14 strap like device
15 side rod

What is claimed is:

1. A high voltage circuit-breaker comprising:
a housing defining a volume for an insulating gas;
at least two making and breaking units arranged in the housing, whereby each making and breaking unit comprises a first contact element and a second contact element for forming an electrically conductive connection, at least the first contact element is movable along an axially extending switching axis of the high voltage circuit-breaker, and the first contact element for each of the at least two making and breaking units is motion-coupled;
a drive device connected to the first contact element of at least one making and breaking unit and configured for moving the first contact element along the switching axis over a moving distance for separating conductive connections;
a gas damper connected to the first contact element of the at least one making and breaking unit and configured for damping movement of the first contact element with a damping force increasing in relation to the moving distance; and
at least two side rods connecting the drive device and the gas damper by surrounding at least one of the making and breaking units.

2. The high voltage circuit-breaker according to claim 1, wherein the damping force increases proportional, non-linear or exponential in relation to the moving distance.

3. The high voltage circuit-breaker according to claim 1, wherein the gas damper comprises at least one through hole, wherein the at least one through hole is arranged in a radially extending lateral surface or in an axially extending side surface.

4. The high voltage circuit-breaker according to claim 1, wherein the gas damper comprises a damping volume having a closed first end and a piston element configured for moving into the damping volume from a second end opposite to the first end.

5. The high voltage circuit-breaker according to claim 4, wherein the first end includes a closed radially extending lateral surface.

6. The high voltage circuit-breaker according to claim 4, wherein the damping volume comprises at least one opening in an axially extending side surface and whereby another axially extending side surface is provided opening-free for guiding the moving piston element.

7. The high voltage circuit-breaker according to claim 6, wherein the at least one opening comprises a width that decreases proportional, non-linear or exponential in moving direction when separating conductive connections.

8. The high voltage circuit-breaker according to claim 4, whereby a radially extending lateral surface of the closed first end and a least a part of an axially extending side surface adjacent to the lateral surface is provided opening-free or hole-free.

9. A method for decelerating an opening operation of a multi-making and breaking unit high voltage circuit-breaker comprising
defining, via a housing, a volume for an insulating gas;
forming an electrically conductive connection via at least two making and breaking units arranged in the housing, wherein each making and breaking unit comprises a first contact element and a second contact element for forming the electrically conductive connection, at least the first contact element being movable along a switching axis of the high voltage circuit-breaker, and the first contact element for each of the at least two making and breaking units being motion-coupled, wherein the high voltage circuit-breaker includes at least two side rods connecting a drive device and a gas damper by surrounding at least one of the making and breaking units;
moving the first contact element along the switching axis to separate conductive connections via the drive device connected to the first contact element of at least one making and breaking unit; and
damping movement of the first contact element of the at least one making and breaking unit with a damping force increasing in relation to a moving distance of the first contact element.

10. The method according to claim 9, wherein damping the movement with the damping force comprises damping the movement with the damping force that increases proportional or exponential in relation to the moving distance.

11. The method according to claim 9, wherein damping the movement with the damping force comprises damping the movement via the gas damper of the high voltage circuit-breaker having at least one through hole arranged in a radially extending lateral surface or in an axially extending side surface to damp the movement of the first contact element of the at least one making and breaking unit.

12. The method according to claim 11 wherein the gas damper comprises a damping volume having a closed first end and a piston element configured for moving into the damping volume from a second end opposite to the first end to dampen the movement via the at least one through hole.

13. The method according to claim 12, further comprising dissipating kinetic energy via moving of the piston element to compress insulating gas present in the gas damper, thereby dissipating kinetic energy.

14. The method according to claim 13, wherein the insulating gas comprises a gas that enables extinguishing an electric arc formed between the first contact element and the second contact element during a current interruption.

15. The method according to claim 13, wherein insulating gas present in the gas damper escapes the damping volume at a beginning of the moving when disconnecting the contact elements, while, with decreasing width of the at least one opening, escaping of the insulating gas is more difficult than at the beginning of the moving, thereby increasing damping of the piston element.

16. The method according to claim 12, wherein the damping volume comprises at least one opening in an axially extending side surface and whereby another axially extending side surface is provided opening-free for guiding the moving of the piston element.

17. The method according to claim 16, wherein the at least one opening comprises a width that decreases proportional, non-linear or exponential in moving direction when separating conductive connections.

18. The method according to claim 12, wherein the closed first end includes a closed radially extending lateral surface.

19. The method according to claim 9 wherein moving the first contact element along the switching axis to separate conductive connections via the drive device connected to the first contact element of at least one making and breaking unit comprising moving the first contact element along the switching axis to separate conductive connections via the drive device connected to the first contact element of the at least two making and breaking units.

\* \* \* \* \*